(12) United States Patent
Marquardt et al.

(10) Patent No.: US 11,258,302 B1
(45) Date of Patent: Feb. 22, 2022

(54) AMBIENT ELECTROMAGNETIC POWER HARVESTING CHIP ADAPTATION BASED ON AVAILABLE POWER LEVEL

(71) Applicant: T-Mobile Innovations LLC, Overland Park, KS (US)

(72) Inventors: Ronald R. Marquardt, Woodinville, WA (US); Lyle W. Paczkowski, Mission Hills, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 17/240,846

(22) Filed: Apr. 26, 2021

(51) Int. Cl.
  *H02J 50/00* (2016.01)
  *H02J 50/27* (2016.01)

(52) U.S. Cl.
  CPC .......... *H02J 50/001* (2020.01); *H02J 50/005* (2020.01); *H02J 50/27* (2016.02)

(58) Field of Classification Search
  CPC ......... H02J 50/001; H02J 50/005; H02J 50/27
  See application file for complete search history.

(56) References Cited

U.S. PATENT DOCUMENTS

| | | | |
|---|---|---|---|
| 8,593,256 | B2 | 11/2013 | Isabell |
| 9,411,992 | B1 | 8/2016 | Marek et al. |
| 9,894,471 | B1 * | 2/2018 | Zalewski ............ H04W 76/10 |
| 10,938,449 | B1 | 3/2021 | Loman et al. |
| 2007/0205902 | A1 | 9/2007 | Cote et al. |
| 2008/0018467 | A1 | 1/2008 | Estevez et al. |
| 2008/0129457 | A1 | 6/2008 | Ritter et al. |
| 2010/0102123 | A1 | 4/2010 | Skowronek |
| 2014/0134468 | A1 | 5/2014 | Schaefer et al. |
| 2019/0034672 | A1 | 1/2019 | Rokhsaz |

(Continued)

FOREIGN PATENT DOCUMENTS

| WO | 2008051598 A2 | 5/2008 |
|---|---|---|
| WO | 2008055212 A2 | 5/2008 |

(Continued)

OTHER PUBLICATIONS

Office Action dated Apr. 30, 2020, U.S. Appl. No. 16/158,299, filed Oct. 12, 2018.

(Continued)

*Primary Examiner* — Daniel Cavallari

(57) ABSTRACT

A method of communicating information from an ambient electromagnetic power harvesting (AEPH) chip. The method comprises receiving energy from a first ambient electromagnetic field by an AEPH chip, wherein the first ambient electromagnetic field provides a first level of power; based on energy received from the first ambient electromagnetic field, performing a first tier of processing by a processor of the AEPH chip; receiving energy from a second ambient electromagnetic field by the AEPH chip, wherein the second ambient electromagnetic field provides a second level of power that is greater than the first level of power; determining by the processor that the second level of power is above a predefined threshold; and based on the second ambient electromagnetic field being above the predefined threshold, performing a second tier of processing by the processor, wherein the second tier of processing comprises writing information by the processor into a non-transitory memory.

7 Claims, 9 Drawing Sheets

(56) References Cited

U.S. PATENT DOCUMENTS

| | | | |
|---|---|---|---|
| 2019/0138870 A1 | 5/2019 | Kuzbari et al. | |
| 2020/0004999 A1 | 1/2020 | Kawaguchi et al. | |
| 2020/0227813 A1* | 7/2020 | Yehezkely | H01Q 21/28 |
| 2021/0019482 A1 | 1/2021 | Shakedd et al. | |

FOREIGN PATENT DOCUMENTS

| | | |
|---|---|---|
| WO | 2015187199 A1 | 12/2015 |
| WO | 2018063449 A1 | 4/2018 |
| WO | 2018132120 A1 | 7/2018 |

OTHER PUBLICATIONS

Notice of Allowance dated Oct. 30, 2020, U.S. Appl. No. 16/158,299, filed Oct. 12, 2018.

Loman, Clinton H., et al., "Battery Coupled Radio Frequency Identity (RFID)," filed Jan. 28, 2021, U.S. Appl. No. 17/161,415.

Marquardt, Ronald, R., et al., "RFID Device with Two-Stage Power Harvesting," filed Sep. 17, 2020, U.S. Appl. No. 17/024,484.

Marquardt, Ronald, R., et al., "Multi-tier Identities in an RFID Chip," filed Dec. 8, 2020, U.S. Appl. No. 17/115,596.

Notice of Allowance dated Oct. 5, 2021, U.S. Appl. No. 17/024,484, filed Sep. 17, 2020.

Marquardt, Ronald, R., et al., "RFID Device with Two-Stage Power Harvesting," filed Jul. 31, 2021, International Application No. PCT/US2021/044086.

Marquardt, Ronald, R., et al., "Multi-tier Identities in an RFID Chip," filed Sep. 20, 2021, International Application No. PCT/US2021/051159.

Foreign Communication From a Related Counterpart Application, International Search Report and Written Opinion dated Nov. 23, 2021, International Application No. PCT/US2021/044086 filed on Jul. 31, 2021.

Foreign Communication From a Related Counterpart Application, International Search Report and Written Opinion dated Dec. 6, 2021, International Application No. PCT/US2021/051159 filed on Sep. 20, 2021.

\* cited by examiner

AMBIENT ELECTROMAGNETIC POWER HARVESTING CHIP ADAPTATION BASED ON AVAILABLE POWER LEVEL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips conventionally are small inexpensive semiconductor devices that have no on-board power. When irradiated with an appropriate electromagnetic field, the RFID chip draws power from the energy in the electromagnetic field and wirelessly transmits an identity via a radio frequency. RFID chips may be coupled to or sewn into clothing. RFID chips may be embedded in or adhered to products. Special scanning or reading devices may be used to stimulate the RFID chips with an electromagnetic field, read the identity broadcast by the RFID chips, and provide this identity back to a computer that the scanning or reading device is communicatively coupled to. Conventional RFID chips may be used in inventory control systems and in other applications.

SUMMARY

In an embodiment, a method of communicating information from an ambient electromagnetic power harvesting (AEPH) chip is disclosed. The method comprises receiving energy from a first ambient electromagnetic field by an AEPH chip, wherein the first ambient electromagnetic field provides a first level of power and, based on energy received from the first ambient electromagnetic field, transmitting an identity by a radio transceiver of the AEPH. The method further comprises receiving energy from a second ambient electromagnetic field by the AEPH chip, wherein the second ambient electromagnetic field provides a second level of power that is greater than the first level of power and greater than a predefined level of power and, based on energy received from the second ambient electromagnetic field, executing logic in a trusted security zone of a processor of the AEPH chip, wherein the trusted security zone of the processor was depowered when receiving energy only from the first ambient electromagnetic field. The method further comprises establishing a trusted wireless link by the trusted security zone of the AEPH chip processor with a scanner, reading information from a trusted security zone of a non-transitory memory of the AEPH chip by the trusted security zone of the AEPH chip processor, and transmitting the information read from the trusted security zone of the non-transitory memory of the AEPH chip via the trusted wireless link to the scanner.

In another embodiment, a method of communicating information from an ambient electromagnetic power harvesting (AEPH) chip is disclosed. The method comprises receiving energy from a first ambient electromagnetic field by an AEPH chip, wherein the first ambient electromagnetic field provides a first level of power and, based on energy received from the first ambient electromagnetic field, performing a first tier of processing by a processor of the AEPH chip. The method further comprises receiving energy from a second ambient electromagnetic field by the AEPH chip, wherein the second ambient electromagnetic field provides a second level of power that is greater than the first level of power, determining by the processor that the second level of power is above a predefined threshold, and, based on determining that the energy received from the second ambient electromagnetic field is above the predefined threshold, performing a second tier of processing by the processor, wherein the second tier of processing comprises writing information by the processor into a non-transitory memory.

In yet another embodiment, a method of communicating information from an ambient electromagnetic power harvesting (AEPH) chip is disclosed. The method comprises receiving energy from a first ambient electromagnetic field by an AEPH chip, wherein the first ambient electromagnetic field provides a first level of power, based on energy received from the first ambient electromagnetic field, performing a first tier of processing by a processor of the AEPH chip, and receiving energy from a second ambient electromagnetic field by the AEPH chip, wherein the second ambient electromagnetic field is provided by a scanner and provides a second level of power that is greater than the first level of power. The method further comprises determining the second level of power by the processor and determining by the processor that the second level of power is above a predefined threshold. The method further comprises, in response to determining the second level of power is above the predefined threshold, initiating a communication initiation session with the scanner by the processor to adapt radio link parameters between the AEPH chip and the scanner based at least in part on the determined second level of power, configuring a radio transceiver of the AEPH chip by the processor with radio link parameters established during the communication initiation session, and communicating with the scanner by the processor via the radio transceiver of the AEPH.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
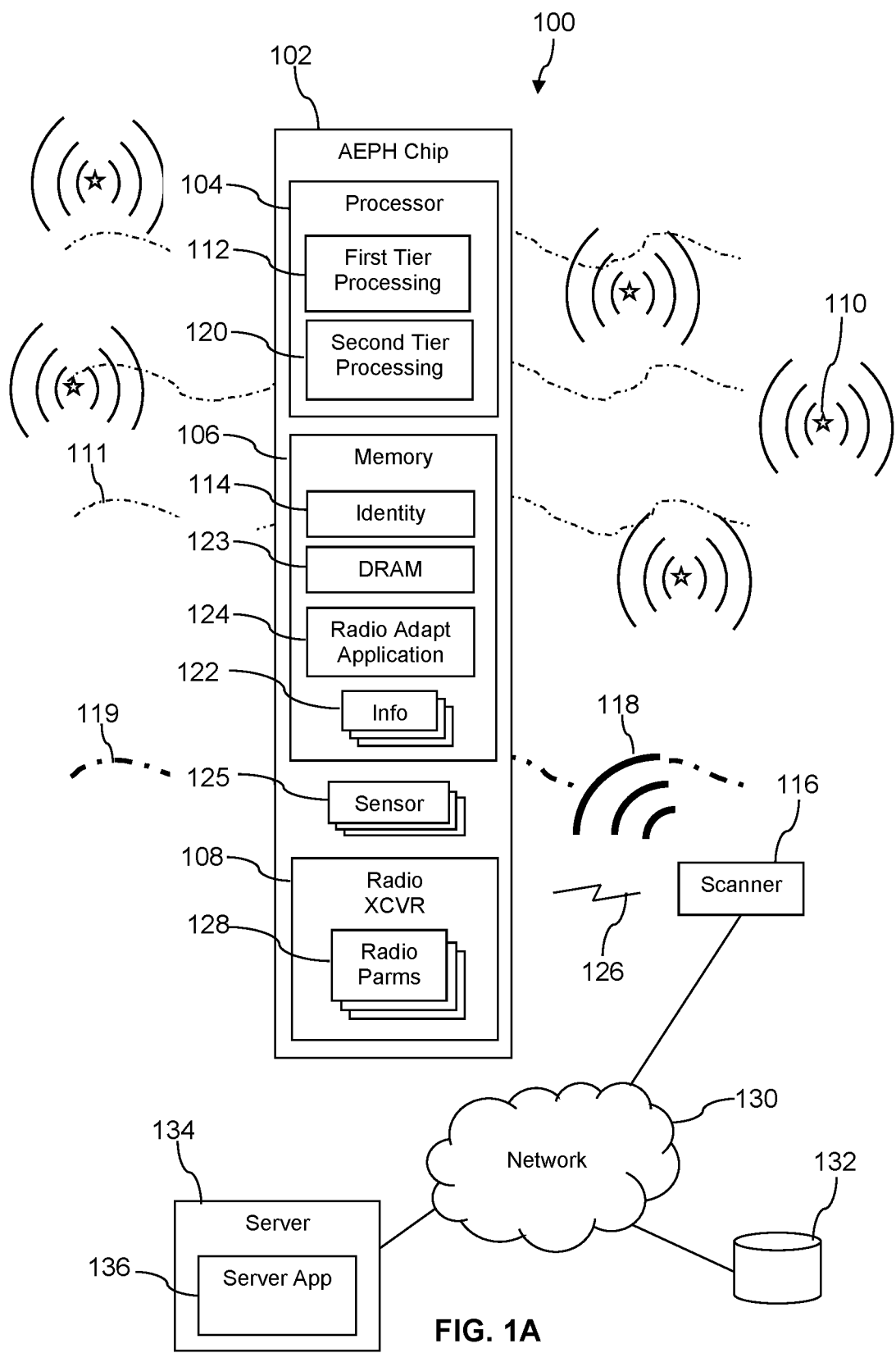
FIG. 1A is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for adapting the function of an ambient electromagnetic power harvesting chip (AEPH) chip based on available power level. Like an RFID chip, the AEPH chip taught herein harvests ambient electromagnetic power to enable it to operate. A conventional RFID chip operates by broadcasting its unique identity and possibly additional statically defined information. Unlike the conventional RFID chip, the AEPH chip taught herein provides power management to perform different operations when exposed to different levels of available ambient electromagnetic power.

When exposed to a first ambient electromagnetic field of relatively low-intensity, the AEPH chip may perform simple operations, such as broadcasting its unique identity and possibly additional statically defined information. When exposed to a second ambient electromagnetic field of moderate-intensity or high-intensity (e.g., electromagnetic intensity above a predefined threshold), however, the AEPH chip taught herein enables different operation modes unavailable at lower power levels. In some contexts, the ambient electromagnetic fields may be referred to as ambient electromagnetic power fields. The higher available power is leveraged by the AEPH chip to supply higher complexity operations which consume higher levels of power and hence may not be feasible when only a relatively lower power level is available. For example, the AEPH chip can write information to memory that would otherwise consume more power than can be harvested from an ambient electromagnetic power field of low intensity. The AEPH chip may write and refresh dynamic random access memory (DRAM) within the AEPH chip that consumes electrical energy at a relatively high rate. The AEPH chip may transition to execution in a trusted security zone of a processor and/or a memory of the AEPH chip. In an embodiment, the transition to execution in the trusted security zone is contingent on completing an authentication handshake with a scanner device. Trusted security zones may be conceptualized as hardware assisted security. When a processor executes a trusted application or portion of an application (e.g., a trustlet) in a trusted security zone, other applications are halted, whereby to avoid the opportunity for these other applications observing data traffic associated with the trusted execution and reading memory in use by the trusted application or trustlet.

In an embodiment, the AEPH chip may negotiate radio communication parameters with a scanner device that is providing the moderate-intensity or high-intensity ambient electromagnetic field when operating in the second mode of operation, for example selecting a frequency band, selecting a data throughput rate, and/or defining an antenna beam width and beam direction. The AEPH chip may then engage in wireless communication with the scanner device with its radio transceiver configured with the negotiated radio communication parameters. The AEPH chip, when exposed to the moderate-intensity or high-intensity ambient electromagnetic field provided by the scanner, can assess the available level of power and adapt a radio transceiver of the AEPH chip to use a preferred frequency band for communication with the scanner based on the assessment.

For example, the scanner can prompt the AEPH chip to measure a signal strength received by the AEPH chip and inform the scanner of the measured signal strength. The scanner can infer the distance between the AEPH chip and itself (or alternatively infer the RF environment) based on the measured signal strength. This could involve not simply measuring signal strength, but also measuring a bandwidth of a channel between the AEPH chip and the scanner. For example, the scanner might transmit a pattern of signals to the AEPH chip using different bit rates whereby to infer the RF environment, and the further communication between the scanner and the AEPH chip may be adapted accordingly. While described here as the scanner inferring distance and RF environment and commanding the AEPH chip to operate accordingly, alternatively the AEPH chip may be the locus for this analysis, decision, and command. This all can be used (a) to choose a frequency band and/or adapt a frequency response of an antenna of the AEPH chip; (b) to choose and/or adapt the radio transceiver of the AEPH chip to a frequency band most suited to the scanner; or (c) to choose and/or adapt the radio transceiver to a plurality of frequency bands on a changing basis by rotation whereby to increase security of communications. The AEPH chip may use this information to adapt an antenna or antennas to use beam forming techniques to both receive signals from the scanner and to transmit signals to the scanner. The AEPH chip may comprise sensors that are enabled in the second operation mode of operation, may capture and store information provided by these sensors, and may transmit this sensor information to the scanner using the wireless link established using the negotiated radio communication parameters.

In an embodiment, the AEPH chip comprises a system on a chip (SoC) that has different internal processors. At a first level of power, only a first processor of the AEPH chip is energized and operates. At a second level of power, a second processor of the AEPH chip is energized and operates (the first processor structure may also operate or may not operate). Because the first processor is limited in its functionality, when energized at the first level, the functions supported by the second processor simply are not available. Only when the power level is high enough to bring up the second processor are the functions supported by the second processor available. This may provide some security benefits. For example, even if a hacker wants to access the information or processing of the second processor it cannot while the device is not appropriately powered.

Turning now to FIG. 1A, a communication system 100 is described. In an embodiment, the system 100 comprises an ambient electromagnetic power harvesting (AEPH) chip 102. The AEPH chip 102 comprises a processor 104, a memory 106, and a radio transceiver 108. In a first mode of operation, the AEPH chip 102 harvests power from a plurality of electromagnetic field emitting devices 110 that collectively produce a relatively low-power ambient electromagnetic power field 111. The emitting devices 110 may comprise mobile phones, smart phones, wearable computers, laptop computers, tablet computers, notebook computers, WiFi devices, and/or Bluetooth devices. The low-power ambient electromagnetic power field 111 may comprise radio emissions in an about 850 MHz frequency band, in an about 1.9 GHz frequency band, and/or in an about 2.5 GHz frequency band. The emitting devices 110 may comprise cell sites. When the AEPH chip 102 harvests power from the low-power ambient electromagnetic power field 111, the functionality of the AEPH chip 102 may be restricted. For example, only a first tier processing 112 of the processor 104 may be active, only an identity 114 stored in the memory 106 may be accessible and may not be writeable (other parts of the memory 106 may not be readable or writeable in the first mode of operation). For example, the radio transceiver 108 may only support transmitting information (e.g., the identity 114) at a low data rate and may not support radio reception (e.g., does not support down shifting a carrier frequency and does not support demodulation of a signal).

In a second mode of operation, a scanner 116 transmits electromagnetic power 118 that produces a medium-power or high-power ambient electromagnetic power field 119, and the AEPH chip 102 harvests power from the medium-power or high-power ambient electromagnetic power field 119. When the AEPH chip 102 harvests power from the ambient electromagnetic power field 119, the functionality of the AEPH chip 102 may not be restricted and additional functionality may be operational. For example, in addition to the first tier of processing 112, the processor 104 may further provide a second tier of processing 120. In addition to the identity 114, a dynamic random access memory (DRAM) 123 may be activated and be readable and writeable in the second mode of operation of the AEPH chip 102. The DRAM 123 may provide support for some of the second tier processing 120, for example by permitting the processor 104 loading instructions from a non-transitory memory portion of the memory 106 into the DRAM 123 and executing the instructions by the processor 104 out of the DRAM 123. A radio adaptation application 124 stored in the memory 106 may be accessible and may be executed in the second tier of processing 120 of the processor 104, for example by virtue of loading at least some of the radio adaptation application 124 into the DRAM 123 by the processor 104 and executing those instructions out of DRAM 123.

In addition to the identity 114, a plurality of information 122 may be readable and writeable in the memory 106 in the second mode or operation. In the second mode of operation, one or more sensors 125 may be powered and able to collect sense information about the environment surrounding the AEPH chip 102. In the second mode of operation, the radio transceiver 108 may support both radio transmitting and radio receiving. In the second mode of operation, the radio transceiver 108 may support operating a radio frequency power amplifier at a moderate or high level of output. In the second mode of operation, the radio transceiver 108 may support sophisticated functions like beam forming, and may support these sophisticated functions in different frequency bands, in different bandwidths, and at different data rates as configured in a set of radio parameters 128.

Figure 1B:
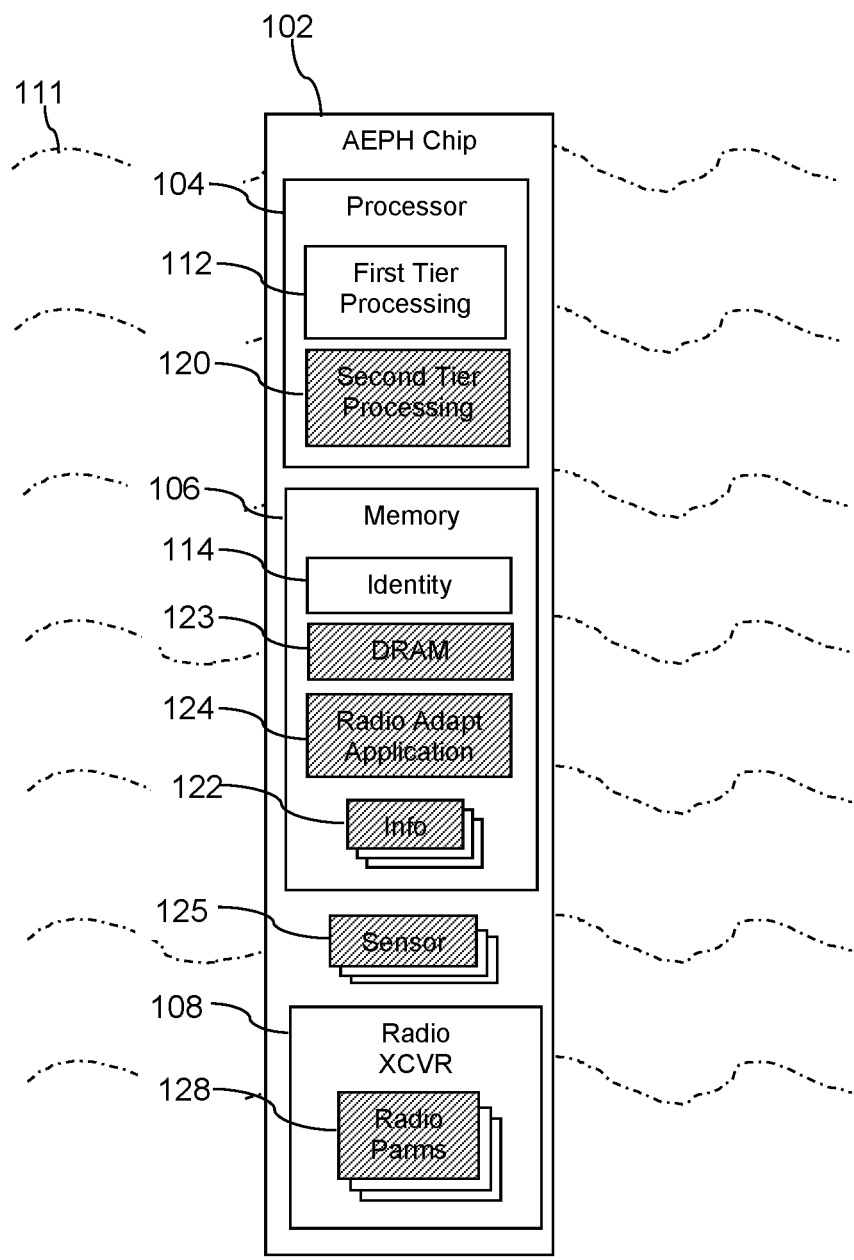
FIG. 1B is an illustration of a first operation mode of an ambient electromagnetic power harvesting (AEPH) chip according to an embodiment of the disclosure.

Turning now to FIG. 1B, the AEPH chip 102 in the first mode of operation is shown harvesting electromagnetic power from the relatively low-power ambient electromagnetic power field 111. In this first mode of operation—when this low-power is all that is available to the AEPH chip 102—the functionality of the AEPH chip 102 may be restricted. In the first mode of operation, the second tier of processing 120 may not be performed by the processor 104. The second tier of processing 120 may consume more power than can be harvested by the AEPH chip 102 from the relatively low-power ambient electromagnetic power field 111.

For example, the second tier of processing 120 may entail higher clock rates for the processor 104 or higher clock rates for portions of the processor (e.g., the processor 104 may comprise a plurality of processor cores, some of which execute at higher clock rates) than can be sustained in the low-power ambient electromagnetic power field 111 (e.g., it is typical that a processor executing at a higher clock rate consumes more power than the same processor executing at a lower clock rate). The second tier of processing 120 may entail loading instructions associated with the processing into the DRAM 123 for executing by the processor 104, and the DRAM 123 may not be powered in the first mode of operation because it would consume more power than can be sustained in the low-power ambient electromagnetic power field 111. For example, refreshing the DRAM 123 may consume more power than can be sustained in the low-power ambient electromagnetic field 111. The second tier of processing 120 may entail input-output operations with other components of the AEPH chip 102 that are not powered in the first mode of operation because they would consume more power than can be sustained in the low-power ambient electromagnetic power field 111. For example, writing to a non-transitory portion of the memory 106 (e.g., flash memory), for example writing to the information 122, may consume more power than can be sustained in the low-power ambient electromagnetic power field 111.

In the first mode of operation, the radio adaptation application 124 may not be accessible, because executing the application 124 by the processor 104 may consume excessive power—for example because portions of the application 124 would be executed by the processor 104 out of the DRAM 123 which is powered down in the first mode of operation, because the application 124 may be executed by the processor 104 at a high clock rate which is not supported by the processor 104 in the first mode of operation, and/or because executing the application 124 entails input-output operations with portions of the radio transceiver 108 that are powered down in the first mode of operation. In the first mode of operation, the sensors 125 may be powered down. In the first mode of operation, the radio parameters 128 stored in the ratio transceiver 108 may not be accessible because operating the radio transceiver 108 in accordance with those radio parameters 128 may consume excessive power. In an embodiment, when the AEPH chip 102 is in the first mode of operation, the radio transceiver 108 provides restricted functionality, for example periodic low-power transmission of the identity 114 on a statically configured frequency band.

In an embodiment, a power level management application by the first tier processing 112 determines the level of power that the AEPH chip 102 is harvesting and compares this level of harvested power to a predefined threshold. If the harvested level of power is below the threshold, the power level management application disables the second tier processing 120, disables access to portions of the memory 106 (e.g., keeps the DRAM 123 powered down and disables access to the radio adaptation application 124), and disables higher level functionality of the radio transceiver 108. If the harvested level of power is above the predefined threshold, the power level management application enables the second tier processing 120, powers on the DRAM 123, enables access to all the memory 106, and enables higher level functionality of the radio transceiver 108. In an embodiment, if the harvested level of power is above the predefined threshold, the power level management application enables other devices that are part of the AEPH chip 102, for example sensors 125. The predefined level of power may be established according to a design calculation of how much power is needed to sustain operation in the second mode of operation (e.g., supply sufficient power for one or more of higher rates of processing in the processor 104, powering on the DRAM 123, writing to non-transitory memory providing higher level functionality of the radio transceiver 108, operating sensors 125, etc.).

In another embodiment, the processor 104 comprises two or more separate processors, for example a plurality of processor cores or a plurality of separate processor chips. The first tier processing 112 may be performed by the first core or the first separate processor chip, and the second tier processing 120 may be performed by the other processor core (or cores) or the other separate processor chip (or chips). The first core processor or separate processor chip may be powered whenever low-power ambient electromagnetic power field 111 is present (or when the medium-power or high-power ambient electromagnetic field 119 is present), while the other processor core or other separate processor chip remains powered down when harvested power is below the predefined threshold. Said in other words, the second processor core or separate processor chip may not be supplied with power until the power harvested from the ambient electromagnetic field exceeds the predefined threshold. The DRAM 123 may not be supplied with power until the power harvested from the ambient electromagnetic field exceeds the predefined threshold. Portions of the memory 106 may comprise a plurality of separate portions, and some of the portions of the memory 106 (e.g., information 122) may remain powered down until power harvested from the ambient electromagnetic field exceeds the predefined threshold. The radio transceiver 108 may comprise a plurality of radio transceivers, and some of the radio transceivers may remain powered down until power harvested from the ambient electromagnetic field exceeds the predefined threshold.

Figure 1C:
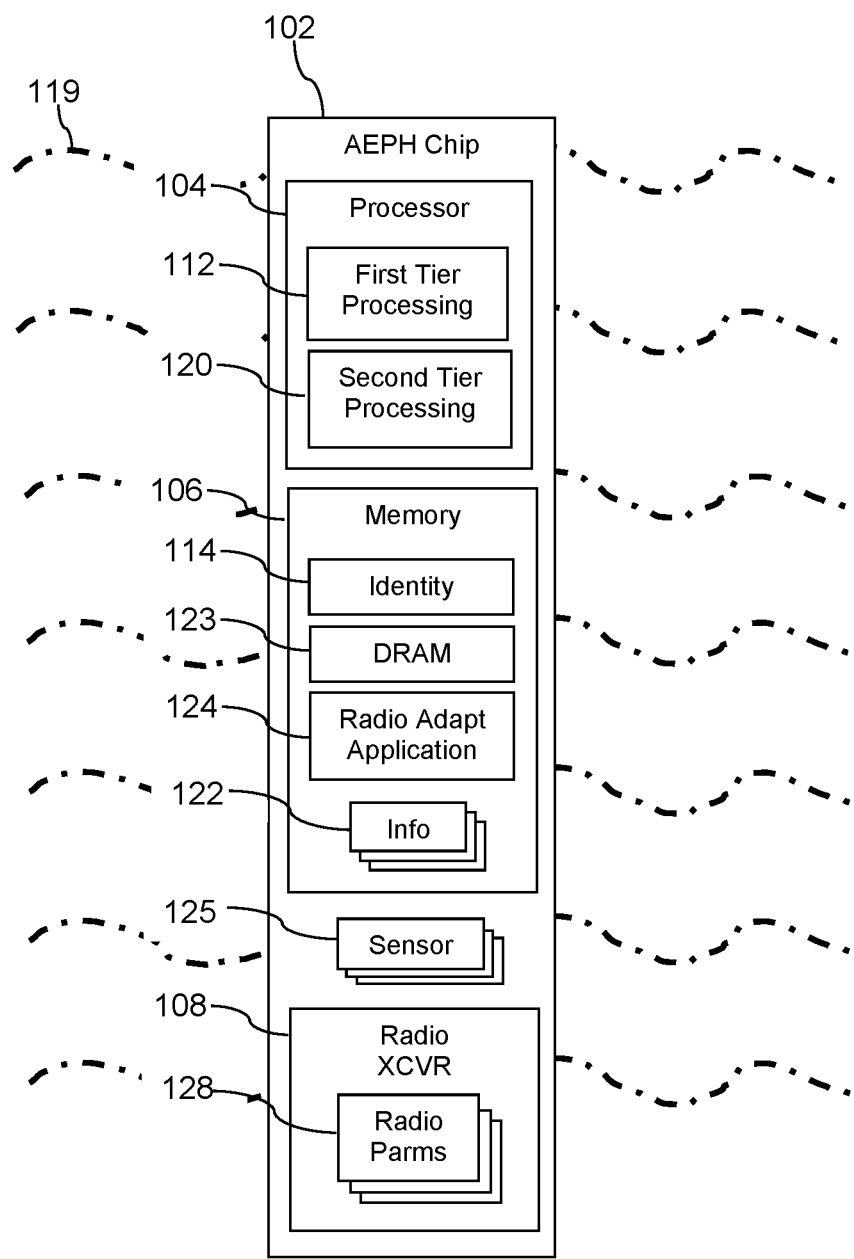
FIG. 1C is an illustration of a second operation mode of an AEPH chip according to an embodiment of the disclosure.

Turning now to FIG. 1C, the AEPH chip 102 is shown receiving power from the medium-power or high-power ambient electromagnetic power field 119 and operating in the second mode of operation. In the second mode of operation both the first tier processing 112 and the second tier processing 120 are supported by the processor 104. This may entail additional cores of the processor 104 coming into service in the second mode of operation. This may entail the processor 104 or portions of the processor 104 executing at a higher clock rate. In the second mode of operation the DRAM 123 is powered on and available for use. In the second mode of operation the radio adaptation application 124 is accessible in the memory 106 and executable by the processor 104 (e.g., executed by the second tier of processing 120). In the second mode of operation the information 122 in the memory 106 is accessible and readable and writeable. In the second mode of operation one or more non-transitory memory portion of the memory 106, for example a flash memory, is readable and writeable. In the second mode of operation higher level functionality of the radio transceiver 108 are provided. For example, in the second mode of operation additional radio transceivers of the radio transceiver 108 may be enabled for use. In the second mode of operation sensors 125 may be powered and operational. In the second mode of operation beam forming of the radio transceiver 108 (e.g., by configuration and/or adapting antenna parameters and/or antenna matching network parameters) is operational.

With reference now FIG. 1A, FIG. 1B, and FIG. 1C, further details of the system 100 are described. The scanner 116 may passively receive information from the AEPH chip 102 while the AEPH chip 102 is in the first mode of operation. The scanner 116, for example, may receive the identity 114 periodically broadcast by the AEPH chip 102 when in the first mode of operation. The scanner 116 may determine that it wants to communicate with the AEPH chip 102, based on receiving and analyzing the identity 114 broadcast by the AEPH chip 102, and begins transmitting electromagnetic power 118 that produces the medium-power or high-power ambient electromagnetic power field 119. In response to the medium-power or high-power ambient electromagnetic power field 119, the AEPH chip 102 enters the second mode of operation. The scanner 116 may establish a wireless communication link 126 with the AEPH chip 102.

In an embodiment, when the scanner 116 initiates communication with the AEPH chip 102, the second tier processing 120 executes the radio adaptation application 124. The radio adaptation application 124 may conduct a communication initiation session with the scanner 116 wherein the radio adaptation application 124 determines a variety of radio parameters 128. For example, the radio adaptation application 124 may negotiate a frequency band for communication with the scanner 116. The radio adaptation application 124 may negotiate a data rate for communication with the scanner 116. The radio adaptation application 124 may negotiate antenna beam forming parameters with the scanner 116. The radio adaptation application 124 may negotiate a radio frequency amplification power level parameter with the scanner 116. In part the negotiations between the radio adaptation application 124 and the scanner 116 depend upon the functional capabilities of these entities. In part the negotiations between the radio adaptation application 124 and the scanner 116 depends upon the power that the AEPH chip 102 is able to harvest from the medium-power to high-power ambient electromagnetic power field 119. The radio adaptation application 124 stores the negotiated radio parameters in the radio parameters 128 of the radio transceiver 108, for example, in a non-transitory memory portion of the radio transceiver 108.

The AEPH chip 102 may initiate a trusted security zone communication operation mode with the scanner 116, wherein the AEPH chip 102 executes at least part of the second tier processing in a trusted security zone of the processor 112. The scanner 116 may correspondingly transition to execution in a trusted security zone of its own processor. When executing in the trusted security zone other processes (e.g., non-trusted processes) may be halted until the trusted processing ceases. This may prevent the other processes from monitoring trusted communications and/or secure data passing between the processor 104, the memory 106, the radio transceiver 108, and sensors 125. In an embodiment, the trusted security zone portion of the processor 104 is not active or accessible while the AEPH chip 102 is operating in the first mode of operation.

The scanner 116 may send a message to the AEPH chip 102 to capture information from one or more of the sensors 125. In response, the second tier processing 120 commands one or more of the sensors 125 to capture information from the environment surrounding the AEPH chip 102, for example temperature sense information, atmospheric pressure sense information, humidity sense information, etc., and to store the sensor data in the memory 106, for example in a non-transitory portion of the memory 106. The scanner 116 may send a message to the AEPH chip 102 to send stored sensor information via the wireless communication link 126 to the scanner 116. The scanner 116 may transmit the sensor information received from the AEPH chip 102 (or a plurality of AEPH chips 102) via a network 130 to a data store 132. The network 130 comprises one or more public networks, one or more private networks, or a combination thereof. The sensor data stored in the data store 132 may be accessed by a server application 136 executing on a computer 134. Computer systems are described further hereinafter. The server application 136 may process the sensor data in various ways, including performing statistical analysis on the data.

Figure 2:
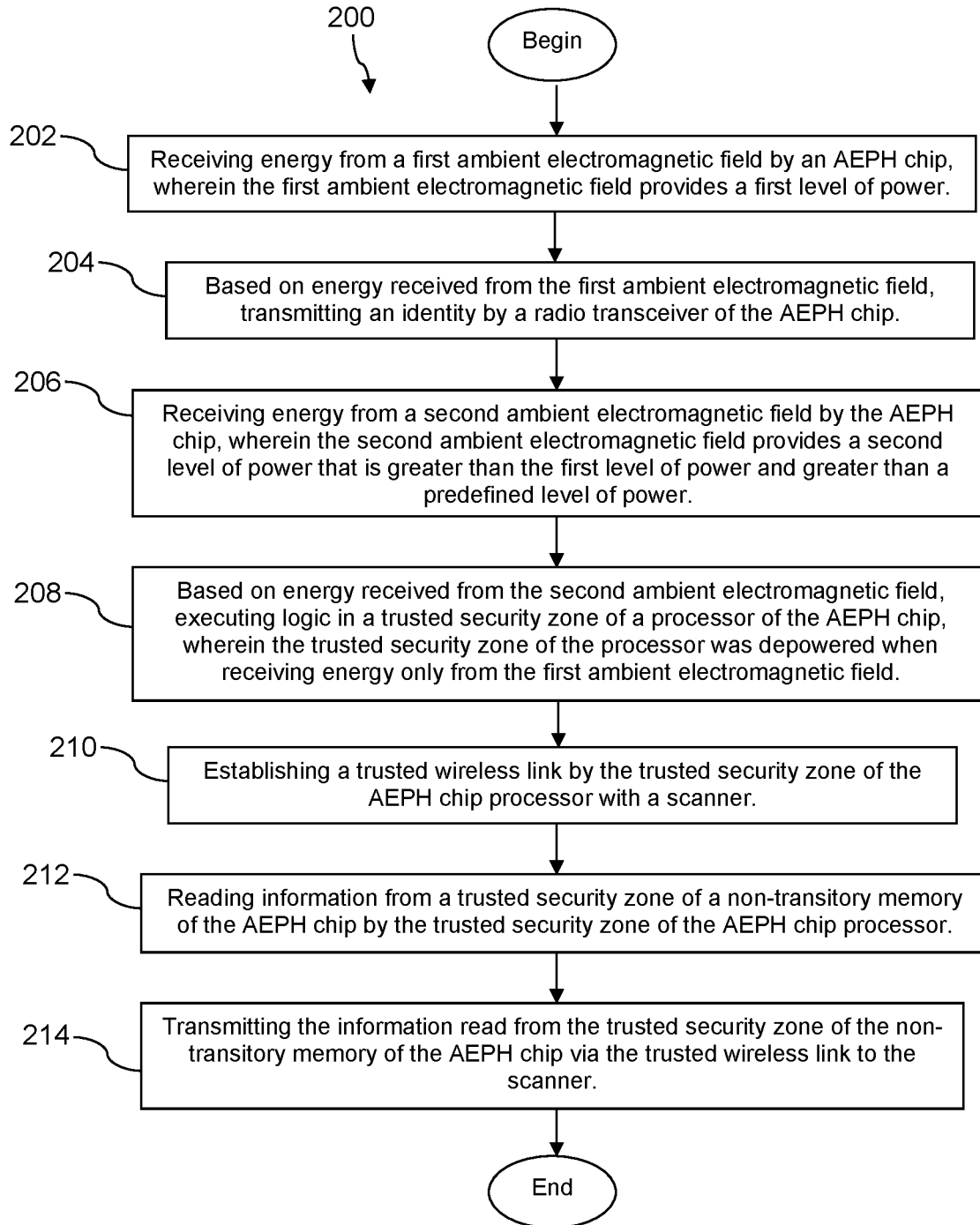
FIG. 2 is a flow chart of a method according to an embodiment of the disclosure.

Turning now to FIG. 2, a method 200 is described. In an embodiment, method 200 comprises a method of communicating information from an ambient electromagnetic power harvesting (AEPH) chip. At block 202, the method 200 comprises receiving energy from a first ambient electromagnetic field by an AEPH chip, wherein the first ambient electromagnetic field provides a first level of power.

At block 204, method 200 comprises, based on energy received from the first ambient electromagnetic field, transmitting an identity by a radio transceiver of the AEPH chip. At block 206, the method 200 comprises receiving energy from a second ambient electromagnetic field by the AEPH chip, wherein the second ambient electromagnetic field provides a second level of power that is greater than the first level of power and greater than a predefined level of power.

At block 208, the method 200 comprises, based on energy received from the second ambient electromagnetic field, executing logic in a trusted security zone of a processor of the AEPH chip, wherein the trusted security zone of the processor was depowered when receiving energy only from the first ambient electromagnetic field. At block 210, the method 200 comprises establishing a trusted wireless link by the trusted security zone of the AEPH chip processor with a scanner. In an embodiment, establishing a trusted wireless link with the reader device comprises the trusted security zone of the AEPH chip processor reading a trust token from a memory of the AEPH chip and transmitting the trust token to the reader device. In an embodiment, the trust token is stored in a portion of memory that is not powered before energy is received from the second ambient electromagnetic field.

In an embodiment, the method 200 further comprises, based on energy received from the second ambient electromagnetic field, powering on a dynamic random access memory (DRAM) that was turned off to conserve energy before energy was received from the second ambient electromagnetic field. For example, some of the logic executed in the trusted security zone is first loaded from a non-transitory memory into the DRAM and retrieved from the DRAM by the trusted security zone of the processor of the AEPH chip.

At block 212, the method 200 comprises reading information from a trusted security zone of a non-transitory memory of the AEPH chip by the trusted security zone of the AEPH chip processor. At block 214, the method 200 comprises transmitting the information read from the trusted security zone of the non-transitory memory of the AEPH chip via the trusted wireless link to the scanner.

In an embodiment, the method 200 further comprising, based on energy received from the second ambient electromagnetic field, initiating functionality of the radio transceiver of the AEPH that was turned off to conserve energy before energy was received from the second ambient electromagnetic field. In an embodiment, the initiated functionality of the radio transceiver comprises transmitting at a higher data rate by the radio transceiver when energy is received from the second ambient electromagnetic field than the data rate at which the identity is transmitted by the radio transceiver when power is received only from the first ambient electromagnetic field. In an embodiment, the method 200 further comprises, based on energy received from the second ambient electromagnetic field, executing a processor of the AEPH chip having a higher clock rate than a clock rate of a processor of the AEPH chip that executes before energy is received from the second ambient electromagnetic field.

Figure 3:
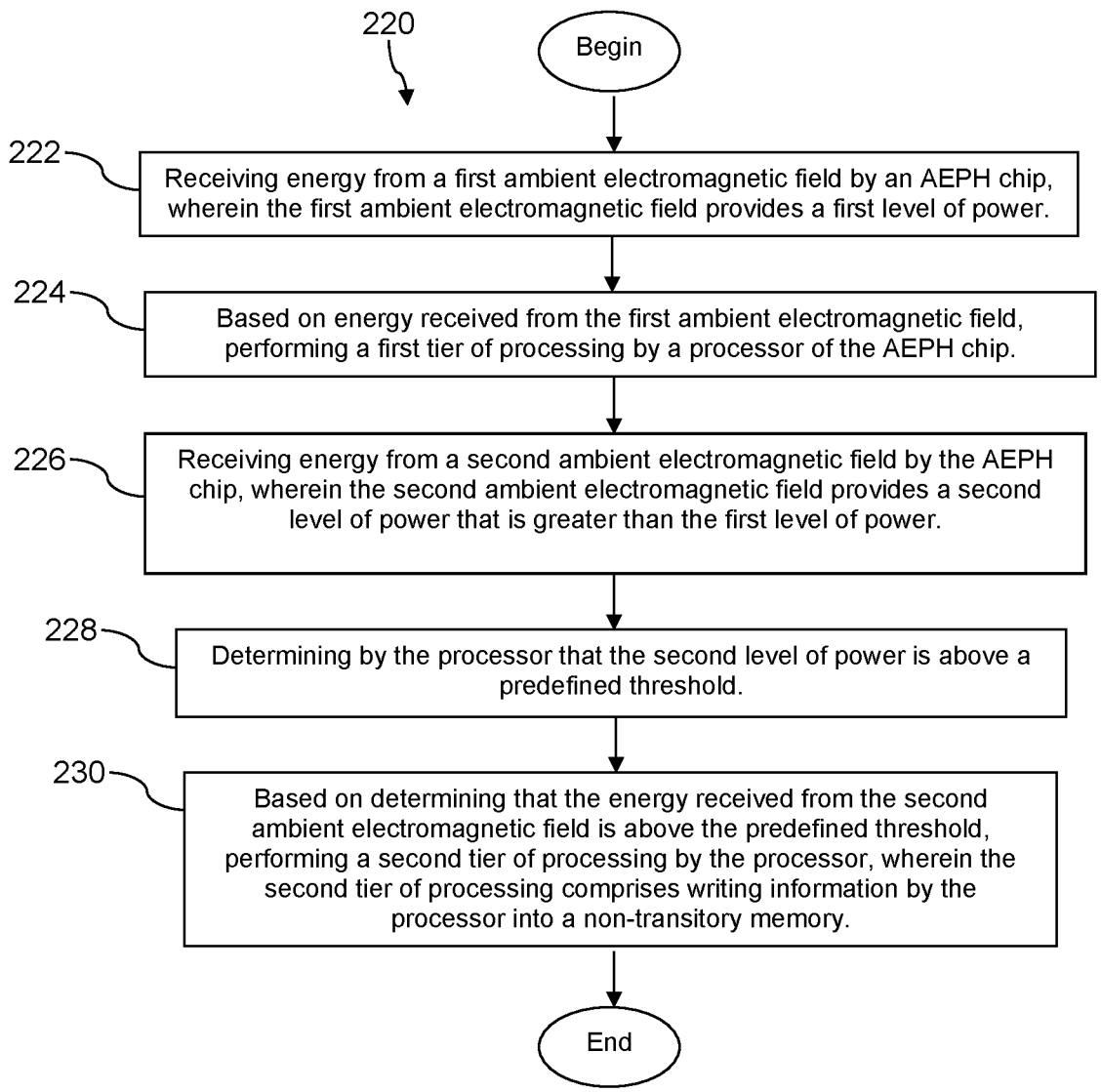
FIG. 3 is a flow chart of another method according to an embodiment of the disclosure.

Turning now to FIG. 3, a method 220 is described. In an embodiment, the method 220 is a method of communicating information from an ambient electromagnetic power harvesting (AEPH) chip. At block 222, the method 220 comprises receiving energy from a first ambient electromagnetic field by an AEPH chip, wherein the first ambient electromagnetic field provides a first level of power. In an embodiment, the first ambient electromagnetic field is provided by cell sites, mobile phones, and smartphones. In an embodiment, the first ambient electromagnetic field is provided by cellular communications at about 850 MHz, at about 1.9 GHz, or at about 2.5 GHz.

At block 224, the method 200 comprises, based on energy received from the first ambient electromagnetic field, performing a first tier of processing by a processor of the AEPH chip. At block 226, the method 220 comprises receiving energy from a second ambient electromagnetic field by the AEPH chip, wherein the second ambient electromagnetic field provides a second level of power that is greater than the first level of power.

At block 228, the method 220 comprises determining by the processor that the second level of power is above a predefined threshold. At block 230 the method 220 comprises based on determining that the energy received from the second ambient electromagnetic field is above the predefined threshold, performing a second tier of processing by the processor, wherein the second tier of processing comprises writing information by the processor into a non-transitory memory. In an embodiment, a dynamic random access memory (DRAM) is powered off when the first level of power is received by the AEPH chip and is powered on when the second level of power is received by the AEPH chip, wherein the second tier of processing comprises reading to and writing from the DRAM. In an embodiment, at least a portion of the processor executes the second tier of processing using a higher clock rate than is used by the processor when it executes the first tier of processing.

In an embodiment, a sensor of the AEPH chip is powered off when the first level of power is received by the AEPH chip and is powered on when the second level of power is received by the AEPH chip, wherein the second tier of processing comprises transmitting data captured by the processor from the sensor via a radio transceiver of the AEPH chip to a scanner that provides the second ambient electromagnetic field. In an embodiment, the second tier of processing comprises enabling a plurality of processor cores to execute which were depowered when the processor was performing the first tier of processing. In an embodiment, the second tier of processing comprises transmitting by the processor via a radio transceiver of the AEPH at a data rate that is higher than a data rate used by the processor to transmit when the processor was performing the first tier of processing.

Figure 4:
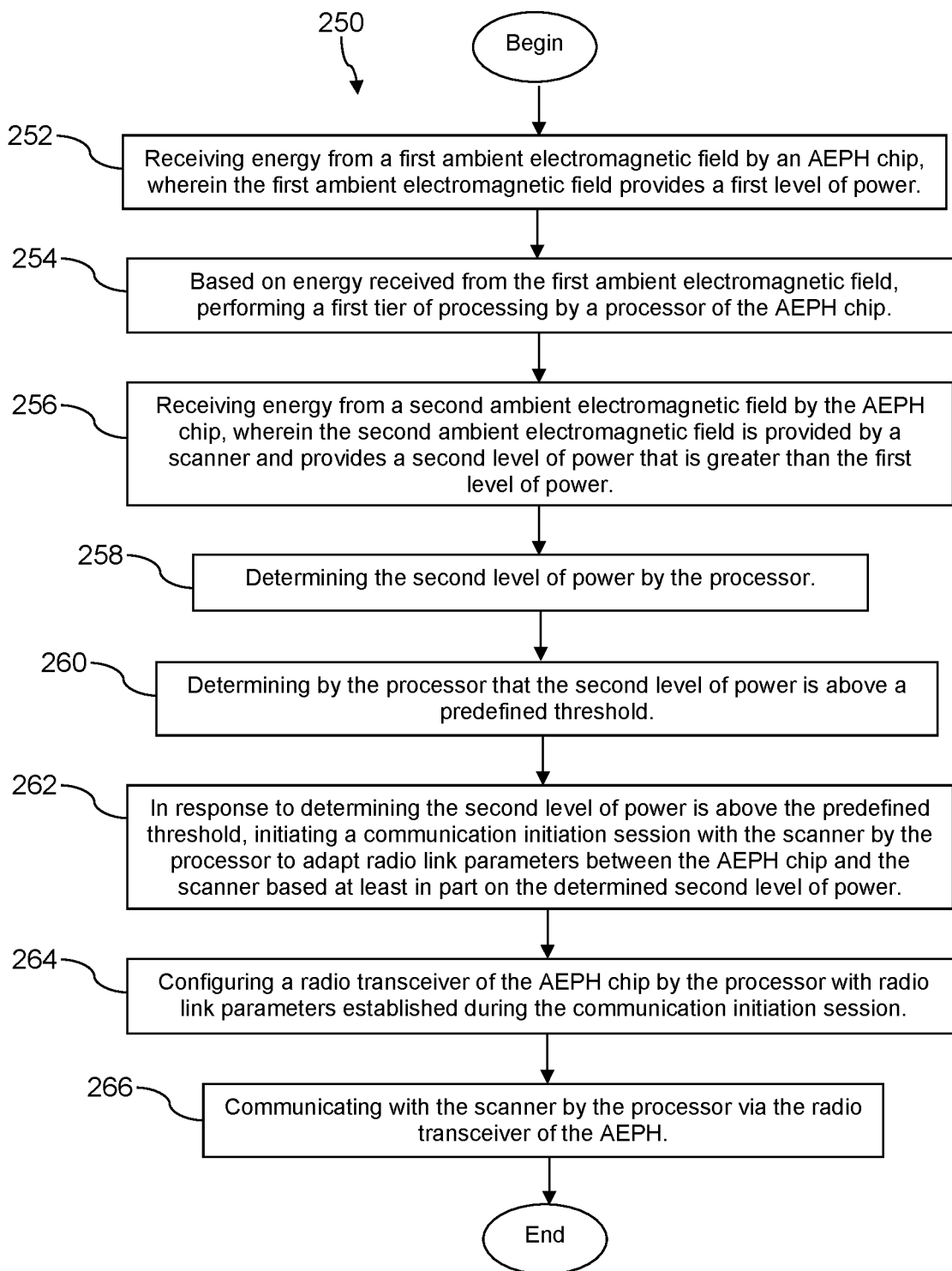
FIG. 4 is a flow chart of yet another method according to an embodiment of the disclosure.

Turning now to FIG. 4, a method 250 is described. In an embodiment, the method 250 is a method of communicating information from an ambient electromagnetic power harvesting (AEPH) chip. At block 252, the method 250 comprises receiving energy from a first ambient electromagnetic field by an AEPH chip, wherein the first ambient electromagnetic field provides a first level of power.

At block 254, the method 250 comprises, based on energy received from the first ambient electromagnetic field, performing a first tier of processing by a processor of the AEPH chip. At block 256, the method 250 comprises receiving energy from a second ambient electromagnetic field by the AEPH chip, wherein the second ambient electromagnetic field is provided by a scanner and provides a second level of power that is greater than the first level of power.

At block 258, the method 250 comprises determining the second level of power by the processor. At block 260, the method 250 comprises determining by the processor that the second level of power is above a predefined threshold. At block 262, the method 250 comprises, in response to determining the second level of power is above the predefined threshold, initiating a communication initiation session with the scanner by the processor to adapt radio link parameters between the AEPH chip and the scanner based at least in part on the determined second level of power.

At block 264, the method 250 comprises configuring a radio transceiver of the AEPH chip by the processor with radio link parameters established during the communication initiation session. In an embodiment, the processor configures the radio transceiver with a frequency band radio link parameter based on the communication initiation session. In an embodiment, the processor configures the radio transceiver with a data rate radio link parameter based on the communication initiation session. In an embodiment, the processor configures the radio transceiver with a beam forming radio link parameter based on the communication initiation session. In an embodiment, the processor configures the radio transceiver with a radio frequency power transmission radio link parameter based on the communication initiation session. At block 266, the method 250 comprises communicating with the scanner by the processor via the radio transceiver of the AEPH. In an embodiment, the processor communicates with the scanner via the radio transceiver to transmit data captured by sensors of the AEPH chip.

Figure 5A:
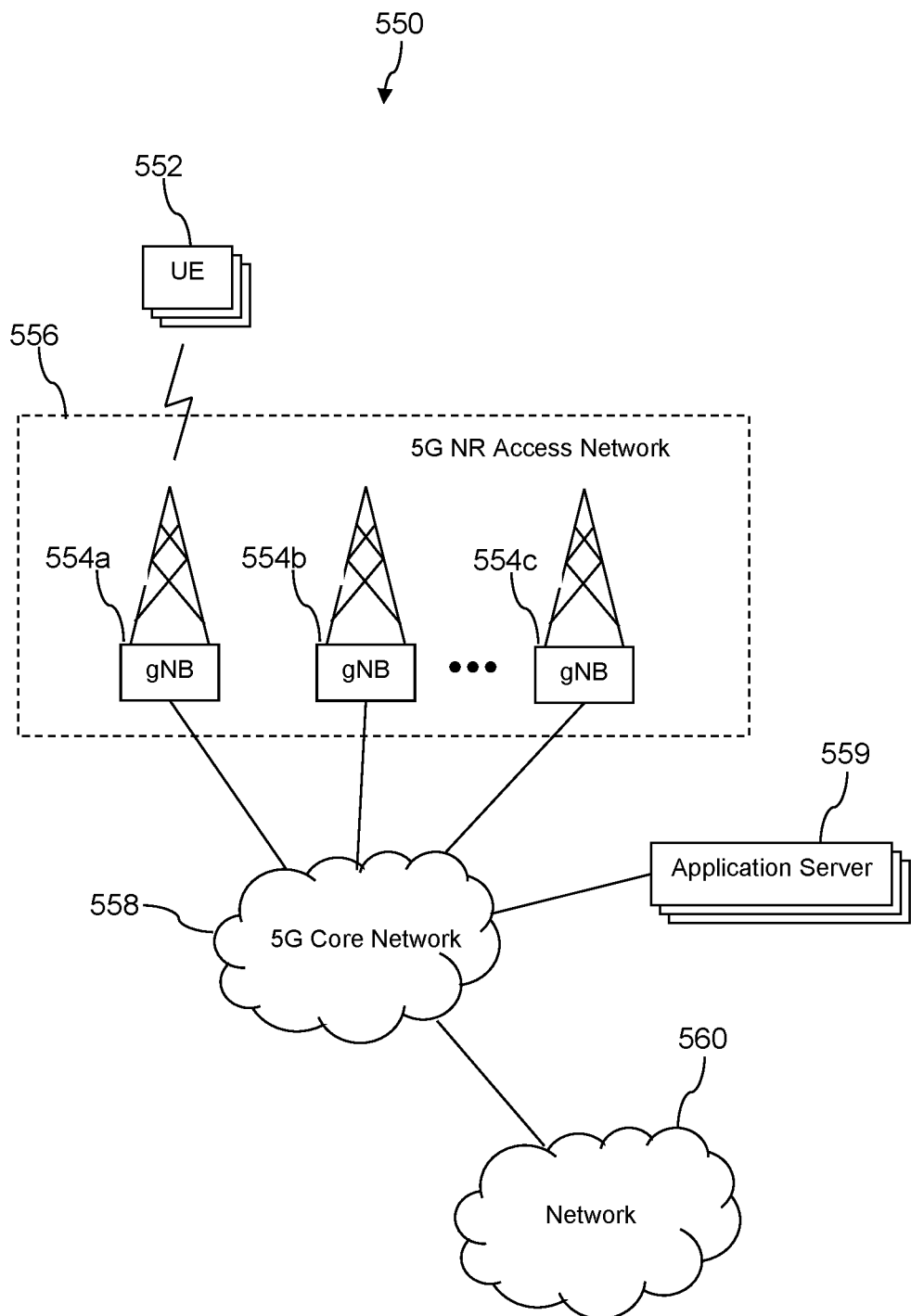
FIG. 5A and FIG. 5B are a block diagram of a 5G communication network according to an embodiment of the disclosure.

Turning now to FIG. 5A, an exemplary communication system 550 is described. In an embodiment, at least a portion of the network 130 described above is consistent with communication system 550. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
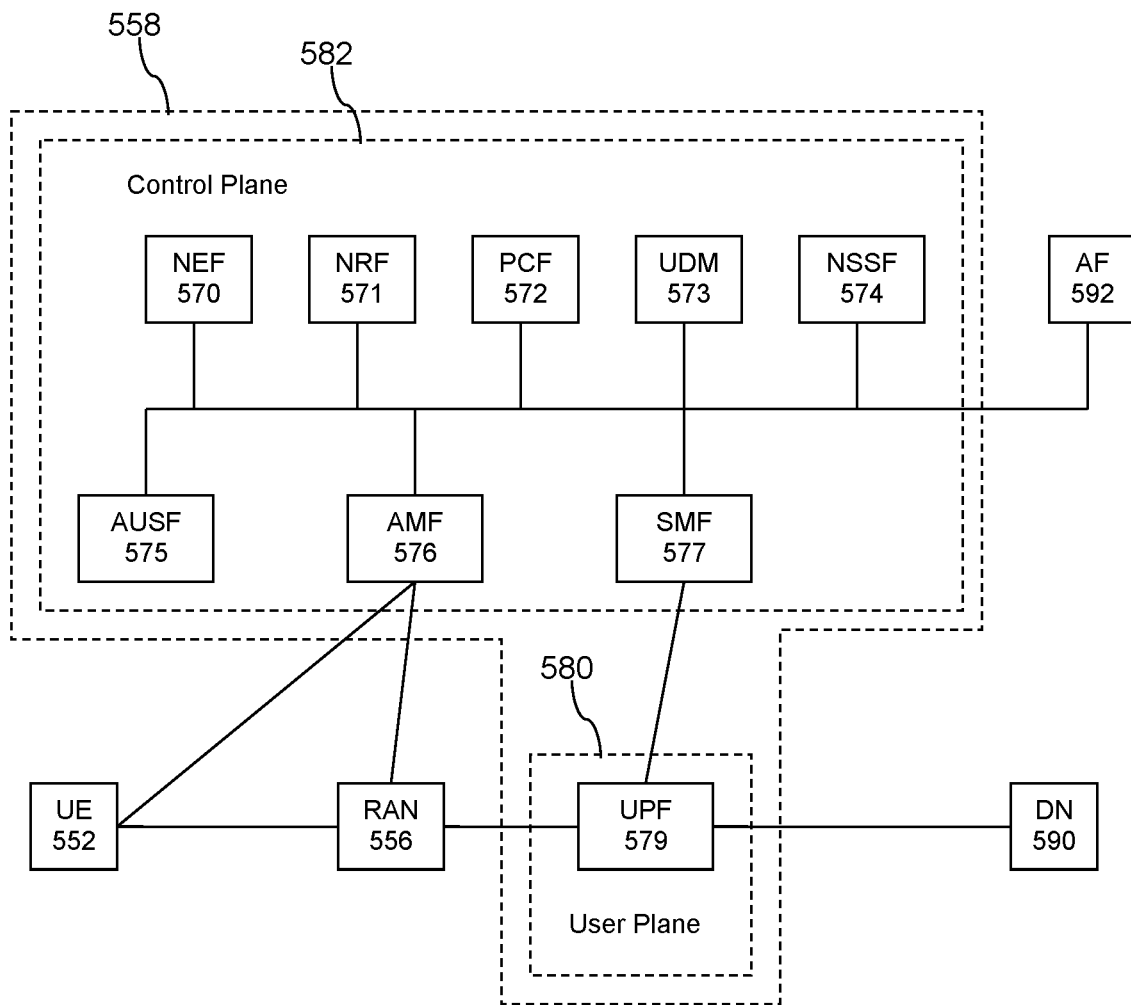

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
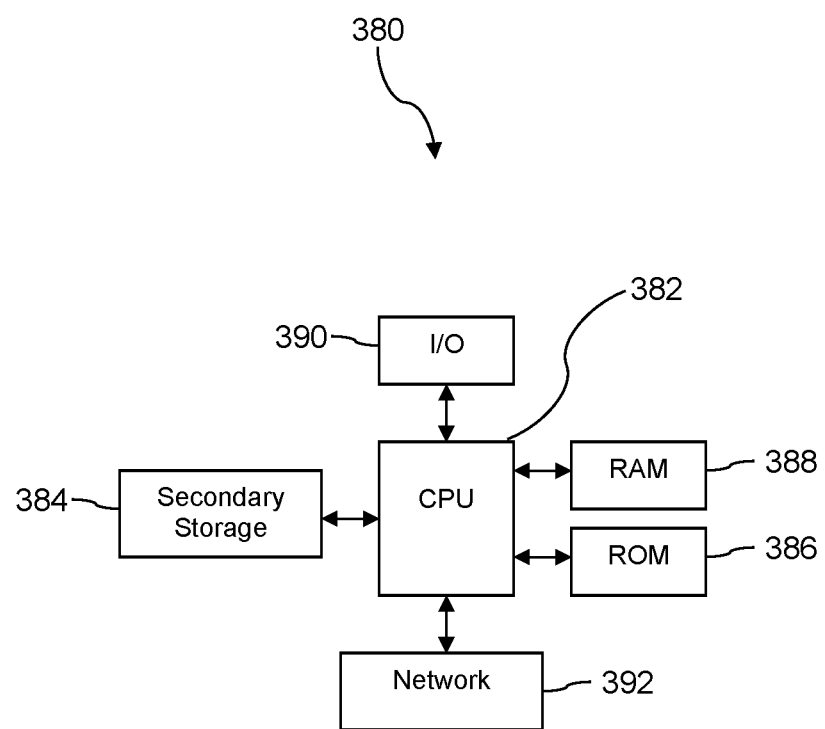
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-transitory storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-transitory memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-transitory memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-transitory memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communicating information from an ambient electromagnetic power harvesting (AEPH) chip, comprising:
   receiving energy from a first ambient electromagnetic field by an AEPH chip, wherein the first ambient electromagnetic field provides a first level of power;
   based on energy received from the first ambient electromagnetic field, transmitting an identity by a radio transceiver of the AEPH chip;
   receiving energy from a second ambient electromagnetic field by the AEPH chip, wherein the second ambient electromagnetic field provides a second level of power that is greater than the first level of power and greater than a predefined level of power;
   based on energy received from the second ambient electromagnetic field, executing logic in a trusted security zone of a processor of the AEPH chip, wherein the trusted security zone of the processor was depowered when receiving energy only from the first ambient electromagnetic field;
   establishing a trusted wireless link by the trusted security zone of the AEPH chip processor with a scanner;
   reading information from a trusted security zone of a non-transitory memory of the AEPH chip by the trusted security zone of the AEPH chip processor; and
   transmitting the information read from the trusted security zone of the non-transitory memory of the AEPH chip via the trusted wireless link to the scanner.

2. The method of claim 1, further comprising, based on energy received from the second ambient electromagnetic field, powering on a dynamic random access memory (DRAM) that was turned off to conserve energy before energy was received from the second ambient electromagnetic field.

3. The method of claim 1, further comprising, based on energy received from the second ambient electromagnetic field, initiating functionality of the radio transceiver of the AEPH that was turned off to conserve energy before energy was received from the second ambient electromagnetic field.

4. The method of claim 3, wherein the initiated functionality comprises transmitting at a higher data rate by the radio transceiver when energy is received from the second ambient electromagnetic field than the data rate at which the identity is transmitted by the radio transceiver when power is received only from the first ambient electromagnetic field.

5. The method of claim 1, further comprising, based on energy received from the second ambient electromagnetic field, executing a processor of the AEPH chip having a higher clock rate than a clock rate of a processor of the AEPH chip that executes before energy is received from the second ambient electromagnetic field.

6. The method of claim 1, wherein establishing a trusted wireless link with the reader device comprises the trusted security zone of the AEPH chip processor reading a trust token from a memory of the AEPH chip and transmitting the trust token to the reader device.

7. The method of claim 6, wherein the trust token is stored in a portion of memory that is not powered before energy is received from the second ambient electromagnetic field.

\* \* \* \* \*